US006562888B1

(12) United States Patent
Frihart et al.

(10) Patent No.: US 6,562,888 B1
(45) Date of Patent: *May 13, 2003

(54) LIGHT-COLORED ROSIN ESTERS AND ADHESIVE COMPOSITIONS

(75) Inventors: Charles R. Frihart, Lawrenceville, NJ (US); Nelson E. Lawson, Savannah, GA (US); Brett A. Neumann, Savannah, GA (US)

(73) Assignee: Arizona Chemical Company, Jacksonville, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,228

(22) Filed: Jul. 27, 1998

(51) Int. Cl.[7] ............................................. C08L 93/04
(52) U.S. Cl. ................. 524/274; 106/31.41; 106/31.73; 106/218; 106/230; 106/241; 524/270; 524/271; 524/272; 530/212; 530/215; 530/218
(58) Field of Search ................................ 106/218, 230, 106/241, 31.41, 31.73; 524/270, 271, 272, 273, 274; 530/212, 215, 218

(56) References Cited

U.S. PATENT DOCUMENTS

| 1,697,530 | A | | 1/1929 | Langmeier | 530/217 |
|---|---|---|---|---|---|
| 2,241,341 | A | | 5/1941 | Ender | 530/217 |
| 2,275,494 | A | | 3/1942 | Bennett | 530/214 |
| 2,324,432 | A | | 7/1943 | Schantz | 106/222 |
| 2,327,009 | A | | 8/1943 | Billing | 530/218 |
| 2,331,803 | A | | 10/1943 | Schlaanstine | 530/218 |
| 2,369,125 | A | | 2/1945 | Anderson | 530/217 |
| 2,375,753 | A | | 5/1945 | Clare | 106/227 |
| 2,504,989 | A | | 4/1950 | Lawrence et al. | 530/216 |
| 2,572,086 | A | | 10/1951 | Wittcoff et al. | 530/218 |
| 2,736,664 | A | | 2/1956 | Bradley et al. | 106/178.1 |
| 2,907,738 | A | | 10/1959 | Greenlee | 530/218 |
| 3,625,877 | A | * | 12/1971 | Jackson, Jr. et al. | 524/270 |
| 4,427,744 | A | * | 1/1984 | Hume, III | 524/271 |
| 4,659,514 | A | | 4/1987 | Beuke | 530/215 |
| 4,714,727 | A | * | 12/1987 | Hume, III | 524/271 |
| 4,725,384 | A | | 2/1988 | Du Vernet | 524/272 |
| 4,758,379 | A | | 7/1988 | Johnson, Jr. | 530/218 |
| 4,775,497 | A | | 10/1988 | Pastor et al. | 530/213 |
| 4,847,010 | A | | 7/1989 | Maeda et al. | 530/216 |
| 4,962,186 | A | | 10/1990 | Johnson, Jr. | 530/218 |
| 5,162,496 | A | | 11/1992 | Johnson, Jr. | 530/212 |
| 5,196,459 | A | * | 3/1993 | Smrt et al. | 524/272 |
| 5,387,669 | A | | 2/1995 | Maeda et al. | 530/216 |
| 5,395,920 | A | | 3/1995 | Maeda et al. | 530/210 |
| 5,504,152 | A | | 4/1996 | Schluenz et al. | 525/54.4 |
| 5,543,110 | A | | 8/1996 | Starr et al. | 422/5 |
| 5,559,206 | A | * | 9/1996 | Williams | 530/218 |
| 5,820,667 | A | * | 10/1998 | Lu et al. | 106/413 |
| 5,830,992 | A | * | 11/1998 | Whalen | 530/218 |
| 5,902,389 | A | * | 5/1999 | Jordan | 106/31.41 |
| 5,972,094 | A | * | 10/1999 | Bates et al. | 106/145.1 |
| 6,074,468 | A | * | 6/2000 | Bates et al. | 106/145.1 |
| 6,165,320 | A | * | 12/2000 | Bates et al. | 162/135 |

FOREIGN PATENT DOCUMENTS

EP      459 760 A2     12/1991

* cited by examiner

*Primary Examiner*—Peter Szekely
(74) *Attorney, Agent, or Firm*—Seed Intellectual Property Law Group PLLC

(57) ABSTRACT

Rosin esters that are both light-colored and color stable may be produced by reacting rosin with an organic compound containing two or more hydroxyl groups each separated from each other by at least four carbon atoms. With appropriate choices for the esterification catalyst and antioxidant(s), the rosin ester may be useful as a tackifier, and can be formulated into an adhesive composition. The adhesive compositions will further comprise an appropriate adhesive polymer.

19 Claims, No Drawings

US 6,562,888 B1

LIGHT-COLORED ROSIN ESTERS AND ADHESIVE COMPOSITIONS

FIELD OF THE INVENTION

This invention relates to rosin esters, and adhesives containing the rosin esters.

BACKGROUND OF THE INVENTION

Esters of rosin and polyhydric alcohols (polyols), which are generally called rosin esters, have been known for over 70 years. See, e.g., U.S. Pat. No. 1,696,337 to Symmes. They are typically prepared by the reaction of rosin (a mixture of isomeric $C_{20}$ tricyclic mono-carboxylic acids) with polyhydric alcohols (hereinafter "polyols") such as pentaerythritol. Rosin esters currently find widespread commercial use in many applications, including as tackifiers for packaging and pressure-sensitive adhesives, and in cosmetic formulations.

For many applications, the color of a rosin ester is a property which determines its commercial viability. Rosin ester coloration is typically measured on the Gardner color scale, with a Gardner color of zero being colorless, and a color of fifteen being red-brown. The marketplace places a premium on rosin esters that are light in color, and will not accept very darkly colored esters. However, light-colored rosin esters are difficult and/or expensive to prepare and maintain. A considerable amount of research has been directed at producing rosin esters that are both initially light-colored, and will maintain this light coloration upon prolonged storage and/or during a heating process to which the ester may be subjected during its formulation into a specific final product. See, e.g., U.S. Pat. Nos. 2,409,173 to Webb; 3,423,389 to Glenn and 5,395,920 to Maeda et al., which are representative only. The '920 patent to Maeda et al. discloses that it is possible (although, in practice, probably cost-prohibitive) to make a rosin ester having a Gardner color of not more than one, through extensive purification, disproportionation and dehydrogenation of the starting rosin and/or final rosin ester.

Despite a significant amount of research, there remains a need in the art for cost-effective methods to achieve light-colored rosin esters. The present invention fulfills this need and provides related advantages as described herein.

SUMMARY OF THE INVENTION

In one aspect, the present invention provides a light-colored esterification product of rosin and an aromatic or aliphatic hydrocarbon moiety containing at least two hydroxyl groups, with the proviso that the hydroxyl groups are separated in the moiety by at least four carbon atoms. In preferred embodiments, the product has undergone disproportionation, has not undergone dehydrogenation, has a color of Gardner value of less than 2.5, includes a stabilizer such as an antioxidant or UV stabilizer, and/or is prepared from a starting rosin having a color of Gardner value of at least 3.

Another aspect of the present invention provides an adhesive composition that includes polymer and, as a modifier thereof, the light-colored esterification product of rosin and an aromatic or aliphatic hydrocarbon moiety containing at least two hydroxyl groups, as described above.

These and other aspects of this invention will become apparent upon reference to the following detailed description. To this end, certain references are cited herein for purpose of clarity and completeness. Such references are incorporated herein by reference in their entirety.

DETAILED DESCRIPTION OF THE INVENTION

The present invention is directed to the esterification products of rosin and aromatic or aliphatic hydrocarbon moieties containing at least two hydroxyl groups. The invention is also directed to adhesive compositions containing these rosin esters. It has been surprisingly discovered that when rosin esters have ester groups separated by at least four carbon atoms, the esters have remarkably light color, and remarkably good performance properties as tackifiers in adhesive formulations.

Rosin is mainly a mixture of $C_{20}$, tricyclic fused-ring, monocarboxylic acids, typified by pimaric and abietic acids, which are commonly referred to as "resin acids." Rosin which is suitable for use in the present invention can be obtained from many sources, and can have a wide range of purities. For example, wood rosin may be employed in the present invention, where wood rosin is obtained from Pinus stumps after harvesting the stumps, chipping the stumps into small chips, extracting the chips with hexane or higher-boiling paraffins, and distilling the hexane or paraffin to yield wood rosin. Gum rosin, which is the name given to rosin that is obtained after scoring a pine tree, collecting the exudate sap, and then distilling away the volatile components, may also be employed in the invention.

The rosin may be tall oil rosin, which is a by-product of the kraft (i.e., sulfate) pulping process for making paper. According to this process, pinewood is digested with alkali and sulfide, producing tall oil soap and crude sulfate turpentine as by-products. Acidification of this soap followed by fractionation of the crude tall oil yields tall oil rosin and fatty acids. Any one or more of the $C_{20}$ cyclic carboxylic acid-containing isomers present in rosin may be used in the invention.

Regardless of its source, rosin is typically characterized by its acid number, and rosins having acid numbers ranging from about 160 to about 195 are preferred according to the invention. Rosin may also be characterized by its Gardner color, where lower Gardner color numbers indicate lighter-colored rosin. Light-colored rosin is preferred for preparation of tackifiers. However, in order for the present invention to have commercial viability, the rosin is preferably not subjected to extensive purifying or modifying processes, which will necessarily add cost to the process for making the rosin ester. Thus, in a preferred embodiment, the rosin is "standard" grade rosin as is readily available from many commercial distillers of naval stores. This standard grade rosin has not be subjected to disproportionation or dehydrogenation processes prior to its use in the esterification reaction of the present invention. Furthermore, the standard grade of rosin has also not undergone any special purification procedures such as redistillation (i.e., further distillation of rosin after it has already been isolated by distillation from crude tall oil), recrystallization or extraction procedures to remove impurities. Instead, the preferred rosin of the present invention is the standard grade of rosin that is produced upon distillation of crude tall oil, and is available from many sources. Such "standard grade" rosin has a color of Gardner value of at least 3, more typically of at least 4, and still more typically of at least 5. In one embodiment, the present invention provides rosin esters having a color that is at least as light as the color of the rosin charged to the esterification reaction vessel, and typically provides rosin esters which are lighter in color than the starting rosin by at least one, at least one and a half, or at least two Gardner value units.

A significant advantage of the present invention is that it provides light-colored and low odor rosin esters from standard grade rosin. Of course, if desired, a purified rosin could also be employed in the present invention. If dehydrogenated rosin would be used in the invention, and the rosin is from crude tall oil, then the tall oil rosin will require substantially higher catalyst levels to achieve dehydrogenation (compared to, e.g., a gum or wood rosin) in order for all of the catalyst not to be deactivated by the sulfur bodies that are present in tall oil rosin.

A preferred standard grade of rosin is available commercially from Union Camp Corporation (Wayne, N.J.) under the UNI-TOL® trademark. Gum rosin, including Indonesian and Chinese gum rosins, is another suitable rosin for preparing rosin esters of the invention, where gum rosin may afford higher melting point rosin esters than can be obtained from using an equivalent amount of tall oil rosin, although may not provide the lightness in color that may be obtained from tall oil rosin.

The esterification product of the invention is prepared from rosin as described above and a polyol, where the polyol is an aromatic or aliphatic hydrocarbon moiety containing at least two hydroxyl groups, where those hydroxyl groups are separated from one another by at least four carbon atoms. As used herein, the hydrocarbon moiety consists solely of hydrogen and carbon, and may be either aromatic or aliphatic. The hydrocarbon may be cyclic (where the cyclic hydrocarbon may be either aromatic or aliphatic) or acyclic, where the acyclic hydrocarbon is aliphatic and may be either linear or branched, saturated or unsaturated, or any combination thereof. Aromatic refers to any conjugated cyclic polyene containing (4n+2) pi electrons, with n=1, 2, 3, etc. A saturated hydrocarbon does not contain any double or triple carbon-carbon bonds, i.e., is incapable of absorbing substances by addition. An unsaturated hydrocarbon contains at least one carbon-carbon double bond or contains at least one carbon-carbon triple bond.

As stated above, the aromatic or aliphatic hydrocarbon moiety contains at least two hydroxyl groups. Additionally, all of the hydroxyl groups are separated from each other by at least four carbon atoms, and in one embodiment of the invention are separated from each other by at least six carbon atoms. When the hydrocarbon moiety is cyclic, more than one path of carbon atoms may be observed to separate any two hydroxyl groups. In such a situation, it is necessary to count the fewest number of carbon atoms which separate two hydroxyl groups, and that fewest number must be four or greater in order for the hydrocarbon moiety to provide an esterification product of the present invention.

The present invention is directed to the surprising discovery that unexpectedly light colored rosin esters may be prepared from polyols having at least two hydoxyl groups, where all of the hydroxyl groups are separated from one another by at least four carbon atoms, and in one embodiment of the invention are separated from one another by at least six carbon atoms. The hydrocarbon moiety of the polyol used to prepare the esterification product necessarily contains at least four carbon atoms, and in one embodiment of the invention, contains at least six carbon atoms. Accordingly, 1,4-butanediol, which contains exactly four carbon atoms, is the smallest polyol that may be used in the present invention. The polyol may contain as many as about 40 carbon atoms. A preferred polyol is known as dimer diol, contains 36 carbon atoms, and is the reduction product of dimer acid. Dimer diol is commercially available from, e.g., Unichema International, Chicago, Ill. as PRIPLAS™ 2033.

In one embodiment, the polyol contains from four to ten carbon atoms. Suitable polyols having carbon numbers falling within this range include 1,4-butanediol, 1,6-hexanediol, 1,8-octanediol and 1,10-decanediol. Another polyol having 4–10 carbon atoms is 1,4-cyclohexanedimethanol, which has the Chemical Abstract Registry Number 105-08-8. 1,4-Cyclohexanedimethanol and other C4–C10 polyols are available from, for example, Aldrich Chemical Co. (Milwaukee, Wis.).

The polyol may contain an aromatic ring. For example, a suitable polyol for preparing an esterification product of the invention is 1,4-$(CH_2OH)_2$Ar, where Ar represents a benzene nucleus and the two methylol groups $(CH_2OH)_2$ are disposed in a para relationship around the benzene nucleus.

In a p referred embodiment, either the starting rosin or the esterification product thereof has undergone disproportionation to provide the product of the invention. Disproportionation is readily achieved by known disproportionation catalysts that are commonly used in the rosin esterification art. Exemplary disproportionation catalysts include, but are not limited to, supported metal catalysts such as rhodium on carbon, platinum on carbon, and palladium on carbon. Metal powder may also serve as a disproportionation catalyst, where exemplary metal powders include, but are not limited to, platinum, nickel, iodide and metal iodides such as iron iodide. These disproportionation catalysts are readily available from many commercial suppliers, for example, Aldrich Chemical Co. (Milwaukee, Wis.). They are typically used at a concentration of 0.01–5% by weight compared to the total weight of the rosin and polyol, and are preferably used at a concentration of 0.01 to 1% by weight.

A preferred disproportionation catalyst is a phenol sulfide compound. A preferred phenol sulfide compound has the formula

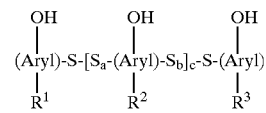

where the Aryl group can be phenyl or naphthyl, $R^1$, $R^2$ and $R^3$ can be the same or different and are hydrocarbon (also known as hydrocarbyl) groups, where "a" and "b" are independently 0, 1 or 2, and where "c" is an integer between 0 and 20. A preferred phenol sulfide compound is an amylphenol disulfide polymer (CAS Registry No. 68555-98-6), where such a polymer is available from Elf Atochem North America, Inc., Philadelphia, Pa., as VULTAC™ 2. Typically, the amylphenol disulfide polymer is added to the rosin and polyol at a concentration of about 0.05 wt % to about 0.5 wt %, based on the total weight of rosin and polyol. Preferably, the phenol sulfide compound is added to the molten rosin prior to beginning the esterification reaction, although it can be added at a later stage. The phenol sulfide compound is believed to afford oxidative stability to the rosin ester, as well as some bleaching during formation of the rosin ester.

The light-colored esterification product (i.e., rosin ester) of the present invention preferably has not been subjected to dehydrogenation. Dehydrogenation refers to the removal of hydrogen from the rosin ester without replacement of another atom. The removal of hydrogen, without the concomitant addition of another atom, results in the formation of a carbon-carbon double bond from a carbon-carbon single bond. Dehydrogenation results when rosin or a rosin ester is exposed to a dehydrogenation catalyst at elevated temperature.

Although the rosin used to form the rosin ester of the present invention is preferably of "standard grade," the rosin may become stabilized in situ during the esterification reaction. As used herein, "stabilization" refers to chemical modification of the rosin, or rosin moiety in the rosin ester, which imparts enhanced thermal or oxidation stability to the resulting rosin ester. Examples of stabilization include disproportionation, hydrogenation and dehydrogenation. As stated above, the rosin esterification product of the present invention preferably undergoes disproportionation but preferably does not undergo an additional dehydrogenation or hydrogenation.

One or more of various additives and catalysts may be present during the rosin esterification reaction. One useful additive is a metal salt, such as a calcium or magnesium salt, of a hindered phenylphosphonate or diphenylphosphonate (hereinafter "phosphonate salt"), which may be added to the reactants (rosin and polyol). These phosphonates are described, for example, in U.S. Pat. No. 3,310,575. A preferred phosphonate salt is calcium bismonoethyl(3,5-di-tert-butyl-4-hydroxy-benzyl)phosphonate (65140-91-2), commercially available from Ciba Specialty Chemicals (Tarrytown, N.Y.) as IRGANOX™ 1425. Approximately 0.1 wt % to about 0.5 wt %, and preferably about 0.15 wt % to about 0.25 wt % of phosphonate salt may be added to the reactants, where the wt % values here and throughout this disclosure are based on the combined weight of rosin and polyol added to the reaction vessel.

Another useful phosphorus-containing additive has the formula (R—O—)$_3$—P, where R is independently a $C_1$–$C_{22}$ hydrocarbyl radical. Exemplary phosphorous-containing additives of this general formula include, without limitation, phosphite compounds such as triphenylphosphite, tris (nonylphenyl)phosphite, phenyldiisodecylphosphite and the like. Phosphinic acid is another useful additive and is represented by the formula $H_2P(O)OH$, where phosphinic acid is commercially available. Phosphoric acid is another useful additive. Such phosphorous-containing additives are typically employed at a concentration of 0.01–1 wt % based on the total weight of rosin and polyol. Phosphorous-containing materials, optionally in combination with VULTAC™ 2, may be used to catalyze an esterification reaction of the present invention.

In one embodiment of the present invention, the esterification product has the following formula

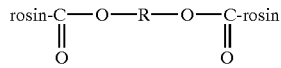

wherein R represents an aliphatic or aromatic hydrocarbon moiety having from 4 to 36 carbon atoms and "rosin" represents the radical of a resin acid (e.g., abietic acid or a stabilized form thereof) that remains following removal of the carboxylic acid that is characteristic of a resin acid. In a further embodiment, R is an aliphatic hydrocarbon moiety having from 4 to 10 carbon atoms. The aliphatic hydrocarbon may be cyclic or acyclic, where the acyclic moiety may be linear or branched, and the moiety may contain both cyclic and acyclic portions. This esterification product is conveniently made from rosin and a dihydric polyol (i.e., a diol, having exactly two hydroxyl groups) having 4 to 36 carbon atoms. In another embodiment, a trihydric polyol (i.e., a triol, having exactly three hydroxyl groups) such as 1,3,5-benzenetrimethanol, 1,2,4-benzenetrimethanol, 1,3,5-cyclohexanetrimethanol and 1,2,4-cyclohexanetrimethanol, may be used.

In another embodiment, the esterification product has the following formula

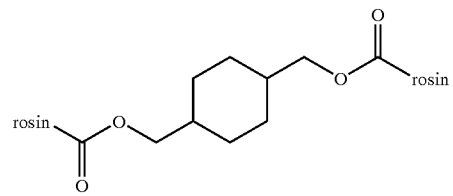

wherein "R" is a specific C8 cycloaliphatic moiety. This esterification product is conveniently prepared from 1,4-cyclohexanedimethanol and rosin.

The present invention provides light-colored rosin esters, that are preferably prepared from standard grade (i.e., not purified) rosin. In one embodiment, the esterification product (i.e., rosin ester) has a color of Gardner value of less than 2.5. In a further embodiment, the esterification product has a color of Gardner value between 0.5 and less than 2.5. In a further embodiment, the esterification product has a Gardner value of less than 2.0, and in a further embodiment, has a Gardner value of between 0.5 and less that 2.0.

In one embodiment, the present invention provides for an adhesive composition comprising a polymer and, as a modifier thereof, the rosin esterification product of rosin and an aromatic or aliphatic hydrocarbon moiety containing at least two hydroxyl groups as described above. The polymer may also be referred to as an elastomer or adhesive polymer component. The polymer should be an adhesively-suitable polymer, in that it may be formulated with the rosin ester of the present invention so as to provide a composition having adhesive properties. Polymers recognized in the art as suitable for the preparation of adhesives are suitable polymers for the adhesive compositions of the present invention.

Suitable adhesive polymers include, without limitation, isoprene-based block copolymers, butadiene-based block copolymers, hydrogenated block copolymers, ethylene vinyl acetate copolymer, polyester, polyester-based copolymers, neoprene, urethane, poly(acrylate), acrylate copolymers such as ethylene acrylic acid copolymer, ethylene n-butyl acrylate copolymer, and ethylene methyl acrylate copolymer, polyether ether ketone, polyamide, styrenic block copolymers, hydrogenated styrenic block copolymers, random styrenic copolymers, ethylene-propylene rubber, ethylene propylene rubber, butyl rubber, styrene butadiene rubbers, butadiene acrylonitrile rubber, polyester copolymers, natural rubber, polyisoprene, polyisobutylene, polyvinylacetate, polyolefin such as polyethylene and polypropylene including atactic polypropylene, and a terpolymer formed from the monomers ethylene, propylene, and a diene (EPDM).

Preferred polymers of the adhesive compositions of the invention include, without limitation, ethylene vinyl acetate copolymer, ethylene n-butyl acrylate copolymer, ethylene methyl acrylate copolymer, polyester, neoprene, urethane, poly(acrylate), ethylene acrylic acid copolymer, polyether ether ketone, polyamide, styrenic block copolymers, hydrogenated styrenic block copolymers, styrene butadiene copolymers, atactic polypropylene, polyethylene, ethylene-propylene rubber, butyl rubber, polyester copolymers, natural rubber, polyester, isoprene, and EPDM. Typically, a preferred polymer of the adhesive compositions of the invention is compatible with the rosin ester of the invention, where compatibility is demonstrated by a mixture of polymer and rosin ester being transparent, rather than opaque.

Typically, the adhesive composition will contain significant amounts of both rosin ester and polymer. For example, per 100 parts of rosin ester, the adhesive composition may contain 50 to 300 parts of polymer.

The adhesive compositions may additionally contain additives that render the composition particularly suitable for a particular application. The use of many such additives is well known in the art, and they may be used for their intended purpose in the adhesive compositions of the present invention. For example, if the adhesive is intended to serve as a hot melt packaging adhesive, then a wax is a useful additional ingredient. Suitable waxes include, without limitation, microcrystalline wax, paraffin wax, waxes produced by Fischer-Tropsch processes, vegetable wax and the like. Normally, a wax will be included in the composition in an amount of between 40 and 100 parts wax per 100 parts of the polymer component.

If the adhesive is intended for a pressure sensitive adhesive (PSA), then oil may be a useful ingredient. Suitable oils include naphthenic oil, paraffinic oils, mineral oils, triglyceride oils and the like. One or more plasticizers may be added to the composition, where suitable plasticizers include, without limitation, esters such as dibutyl phthalate and dioctyl phthalate, chlorinated paraffins. One or more fillers, such as carbon black, titanium oxide and zinc oxide. Extender oils may be present in the composition, where exemplary extender oils include, without limitation, liquid paraffin, castor oil, rape seed oil, mineral oil, and the like.

Other resins may be present in the adhesive composition, where suitable resins include, without limitation, cycloaliphatic hydrocarbon resins, $C_5$ hydrocarbon resins, $C_5/C_9$ hydrocarbon resins, $C_9$ hydrocarbon resins, fully or partially hydrogenated hydrocarbon resins, terpene resins, modified terpene resins (terpene phenol or styrenated terpene), liquid resins, other rosin esters, and the like.

Thus, adhesives compositions of the present invention may include, in addition to polymer and one or more rosin esters of the invention, an additive selected from wax, process oil, cycloaliphatic hydrocarbon resin, $C_5$ hydrocarbon resin, $C_5$–$C_9$ hydrocarbon resin, $C_9$ hydrocarbon resin, terpene resin, terpene phenolic resin, terpene styrene resin, and esters of rosin and polyols characterized in that the hydroxyl groups thereof are separated by fewer than four carbon atoms.

The adhesive composition of the present invention may be prepared from the rosin ester, adhesive polymer and additional ingredients as described above, using conventional techniques and equipment. For example, the components of the adhesive composition may be blended in a mixer such as a Sigma blade mixer, a twin screw extruder or the like. The adhesive composition may be shaped into a desired form, such as a tape or sheet, by an appropriate technique including extrusion, compression molding, calendaring or the like.

The adhesive composition may be applied to a substrate by melting the composition and then using conventional hot melt adhesive application equipment recognized in the art. Suitable substrates include textile fabric, paper, glass, plastic and metal. Typically, about 5 to 50 $g/m^2$ of adhesive composition is applied to a substrate. The adhesive composition is broadly useful as a hot melt adhesive for those applications where hot melt adhesives are currently employed. The present invention provides that the melting point of the rosin ester tackifier can be selected to suit the end-use for the adhesive composition is intended.

The rosin ester of the present invention does not show large changes in color when subjected to storage conditions at elevated temperature over extended periods of time. The rosin esters so formed will have good color stability at elevated temperature, and hot melt adhesives made from them will have good viscosity stability with little or no skinning. Upon heating, an acceptable rosin ester will exhibit minimal increase in coloration. A rosin ester according to the inventive process will show little or no skinning when mixed with an adhesive polymer, e.g., PETROLITE BE SQUARE™ 185 or ELVAX™ 250 ethylene vinyl acetate (Du Pont, Wilmington, Del.), and heat aged at 176° C. for 96 hours.

The process of the present invention provides esters of rosin having light-color and good color stability, with a minimum of labor and cost. The rosin esters of the invention are thus well-suited for use as tackifiers and in other applications where light-colored, color stable rosin esters are needed or desired. The rosin esters of the invention are particularly well suited for hot-melt adhesive tackifiers and pressure sensitive adhesive tackifiers because they display good color stability at elevated temperature, with little or no adhesive skinning, and an acceptable change in adhesive viscosity.

In a general process to prepare rosin esters according to the invention, rosin is charged to a reaction vessel under an inert, i.e., non-oxidizing atmosphere, typically nitrogen, and heated to a temperature of about 160° C.–195° C. Since the rosin ester has a light-color, and color is sensitive to oxygen exposure, the reaction is preferably conducted under an inert atmosphere to minimize such oxygen exposure. A small amount of a reaction rate enhancer and/or other additive such as a stabilization agent as described above, is then added, along with the polyol. Heating is continued, typically to a temperature of about 240–280° C., with concomitant collection of water which is formed by the esterification reaction.

The progress of the reaction may be monitored by periodically pulling samples and measuring the acid number of the samples. Techniques to measure an acid number are well known in the art and need not be described here. See, e.g., ASTM D-465 (1982). Typically, a 12 hour reaction time at 270–280° C. can provide a rosin ester having an acid number of about 10.

Once the acid number of the product mixture has reached about 50, preferably about 25, the reaction vessel may be vacuum evacuated to a pressure of about 10–50 mbar at a preferred temperature of 275° C. or slightly above. Simultaneously, an inert gas, preferably steam or nitrogen, may be injected into the molten rosin ester. These "stripping" conditions are maintained until the acid number of the product mixture reaches the desired target. The use of vacuum, nitrogen or steam sparging and a temperature of about 275° C. or higher provides for the removal of volatile rosin materials, such as decarboxylated rosin. These volatile materials are desirably removed so as to achieve the target softening point for the resin, and also because they tend to adversely affect the odor, color and color stability of the rosin ester product.

As an alternative preferred process, rosin is charged to a reaction vessel under an inert, i.e., non-oxidizing atmosphere, typically nitrogen, and heated to a temperature of about 140° C.–170° C. Then a small amount of phosphonate salt as defined above, and preferably calcium bismonoethyl(3,5-di-tert-butyl-4-hydroxy-benzyl)-phosphonate, is added to the molten rosin. The preferred phosphonate salt is IRGANOX™ 1425. Approximately 0.1 wt % to about 0.5 wt %, and preferably about 0.15 wt % to about 0.25 wt % of phosphonate salt is added to the rosin.

Either before, simultaneous with, or soon after adding the phosphonate salt to the rosin, a phenol sulfide compound may also be added to the rosin. Preferably, the phenol sulfide compound is added immediately before addition of the phosphonate salt, and the phenol sulfide compound has the formula given above. A preferred phenol sulfide compound is amylphenol disulfide polymer (e.g., VULTAC™ 2 as described above), and is added to the reaction mixture in an amount of about 0.05 wt % to about 0.5 wt % (based on the total weight of rosin and polyol). Next added to the molten rosin is the polyol.

Phosphite esters/derivatives can be added to the esterification reaction mixture in order to help reduce the ester color. An example of a suitable arylphosphite is tris (nonylphenyl)phosphite. One or more of these materials may be added either before, simultaneous with, or after, adding the phenol sulfide compound to the reaction mixture.

The combination of phosphite ester and phosphonate salt may be used regardless of whether the rosin or the polyol is in equivalent excess, or indeed even when the equivalents of rosin equals the equivalents of polyol.

Phosphite ester addition to a forming rosin ester is preferably done after the charging of the rosin. After addition of the phosphite ester, the rosin esterification reaction is allowed to proceed until the acid number of the product mixture reaches about 50 to 25. Then the reaction vessel is placed under vacuum to a pressure of about 10–50 mbar, while injecting an inert gas, preferably nitrogen or steam, into the molten it rosin ester, as described previously. These "stripping" conditions are maintained until the acid number reaches the desired target, which for rosin esters to be used as tackifiers, is about 5 to 15.

The rosin esters of the present invention may find commercial use as tackifiers for packaging adhesives, bookbinding adhesives, furniture adhesives, textile adhesives, wood bonding adhesives, disposable (nonwoven) adhesives, automotive adhesives, appliance adhesives, footwear adhesives, pressure sensitive adhesives and construction adhesives, and in cosmetic formulations, among other uses.

The rosin esters of the present invention, prepared from polyols having hydroxyl functionality separated by at least four carbon atoms, and preferably by at least six carbon atoms, are surprisingly light in color, compared to rosin esters prepared from polyols with hydroxyl groups separated by less than four carbon atoms. In addition to having light color, they also provide other surprising advantages. For instance, they have surprisingly low odor. They also may be formulated into adhesive compositions and, because they typically have low softening points, the adhesive compositions may be prepared and used at relatively low temperature. Such low temperatures are typically desirable because adhesives will oxidize and degrade less at a lower temperature. Although the rosin esters of the of the invention may have low softening points, they still can be used in an adhesive formulations that demonstrate excellent adhesive properties, even at elevated temperature, which is a surprising result. Furthermore, they provide a low softening point material that has superior performance in many respects to a blend of rosin esters that has a composition designed to provide the same low softening point.

When prepared from linear diols, which are a preferred polyol from which to prepare rosin esters of the present invention, they are midblock specific (in styrenic block copolymers) while retaining some polarity for adhesion to low surface energy substrates. They are compatible with many different polymers, which cannot be said for liquid C5 hydrocarbon resins. They give an excellent balance between adhesion and cohesion in hot melt PSA formulations. Also, they afford lower room temperature viscosities than typical commercial competitive resins, such as WINGTACK™ 10 aliphatic C-5 petroleum hydrocarbon resin (Goodyear, Akron, Ohio.).

When prepared from cycloaliphatic diols, (e.g., 1,4-cyclohexanedimethanol) which are another preferred polyol from which to prepare rosin ester of the present invention, the resulting rosin esters are surprisingly light in color and have surprisingly low odor. These rosin esters also demonstrate midblock specificity in styrenic block copolymers, as seen by less migration of the tackifier in an adhesive formulation. They provide adhesion characteristics in pressure sensitive adhesives (PSA's) comparable to other rosin esters while retaining low odor and color. Cycloaliphatic rosin esters have demonstrated good compatibility with a wide range of polymers. In combination with ethylene n-butyl acrylate polymers (EnBA); they provide adhesives with higher than expected heat resistance, as seen by the rheological crossover point of the formulated adhesive, in comparison with resins having twice the softening point. These resin also offers a lower Tg (per rheological measurements) than prior art resins. Due to this difference between the Tg and crossover point, the formulator will be able to make low application temperature adhesives with good open time and high cohesive strength.

The invention will now be illustrated in more detail by the following non-limiting examples, which demonstrate the advantageous properties of the present invention. Parts and percentages are by weight unless indicated otherwise.

Tall oil rosin (CAS# 8050-09-7) was used in the Examples. Unless otherwise indicated, reagents are of standard commercial grade as obtained from chemical supply houses (e.g., Aldrich Chemical, Milwaukee, Wis.). VULTAC™ 2, which is an amylphenol disulfide polymer (CAS# 68555-986), was obtained from Elf Atochem North America, Inc., Philadelphia, Pa. (this same phenol sulfide may be obtained and used as a solution in other solvents, and could be used in solvent-free form). IRGANOX™ 1425 catalyst (CAS# 65140-91-2), which is calcium bis (monoethyl(3,5-di-tert-butyl-4-hydroxybenzyl) phosphonate), was obtained from Ciba Specialty Chemicals (Tarrytown, N.Y.). HERCOLYN™ D refers to the methyl ester of hydrogenated wood rosin, as supplied by Hercules (Wilmington, Del.; website=herc.com); KRATON™ 1107 refers to a styrene isoprene styrene linear block copolymer having 14% styrene residues and 86% isoprene residues (weight basis) obtained from Shell Chemical (Houston, Tex.); and WINGTAC™ 95 refers to a C5 (i.e., isoprene-based) aliphatic petroleum hydrocarbon resin having a 95–101° C. Ring & Ball softening point from Goodyear (Akron, Ohio). UNI-TAC™ XL-10, UNI-TAC™ R85, UNI-TAC™ R85 LT are all rosin (tall oil rosin) esters from Union Camp Corporation (now Arizona Chemical Company, Jacksonville, Fla.) where UNI-TAC™ R85 refers to a glycerol ester of tall oil rosin having a softening point of about 85° C., UNI-TAC™ R85 LT refers to a version of UNI-TAC™ R85 having hydrogenated rosin residues, and UNI-TAC™ R 100LT refers to a tall oil rosin ester of pentaerythritol having hydrogenated rosin residues, and UNI-TAC™ XL-10 is a rosin ester that is a clear viscous liquid. NIREZ™ 2040 is a terpene phenolic resin having a softening point of about 120° C. available from Arizona Chemical Company (Jacksonville, Fla.). ELVAX™ 220 is an ethylene vinyl acetate copolymer having a melt index of 134–168 g/10 min and a vinyl acetate content of 28% from du Pont (Wilmington, Del.). PETROLIE BE SQUARE™ 185 is a microcrystalline wax having a softening point of 185° F. from Petrolite (now part of Baker Petrolite of Sugar Land, Tex., in turn a part of Baker Hughes website= bakerhughes.com). EnBA is an abbreviation for ethylene n-butyl acrylate copolymer, where XW 23. AH is a product designation for a member of the ENABLE™ class of EnBA resins from Exxon Chemical Company (Houston, Tex.). ESCOREZ™ 5600 is a hydrogenated petroleum-based aromatic hydrocarbon tackifier resin having a softening point of 103° C. from Exxon Chemical Company (Houston, Tex.).

Suitable stabilizers, which may be present in up to about 1 wt % based on the weight of rosin ester, include one or more of IRGANOX™ 565 (CAS# 991-84-4), which is 4-(4,6-bis(octylthio)-s-triazin-2-yl)amino-2,6-di-tert-butylphenol, IRGANOX™ 1010 (CAS 6683-19-8) which is tetrakis(methylene(3,5-di-tert-butyl-4-hydroxyhydrocinnamate))methal or IRGANOX™ 1520 (CAS 110553-27-0) which is 2-methyl-4,6-bis{(octylthio)methyl}phenol were obtained from Ciba Specialty Chemicals (Tarrytown, N.Y.). ULTRANOX™ 257, which is the reaction products of 4-methylphenol with dicyclopentadiene and isobutylene (CAS# 68610-51-5) and ULTRANOX™ 236 (CAS 96–69–5) which is 4,4'-thio-bis-(2-tertiary-butyl-5-methylphenol) were obtained from GE Specialty Chemicals, Parkersburg, W.Va. WESTON™ 618 stabilizer, which is distearyl pentaerythritol diphosphite (CAS# 3806-34-6) was obtained from GE Specialty Chemicals, Morgantown, W.Va.

In the following examples, regarding reactant stoichiometry, the term "equivalent excess" is used, and is intended to have its standard meaning as employed in the art. However, for additional clarity, it is noted that equivalents refer to the number of reactive groups present in a molar quantity of a molecule. Thus, a mole of a monocarboxylic acid (e.g., rosin) has one equivalent of carboxylic acid, a mole of diol (e.g., 1,4-cyclohexanedimethanol) has two equivalents of hydroxyl. A 10% equivalent excess of rosin refers to the fact that 1.1 moles of carboxylic acid groups from rosin are present in the reaction mixture for every 1.0 moles of hydroxyl groups from polyol.

The term "AN" refers to acid number, and may be measured by techniques well known in the art. See, e.g., ASTM D-465 (1982). The term "gsm" refers to grams per square meter. Softening points were measured with a Mettler FP80 Central Processor and a Mettler FP83 HT Dropping point cell with a softening point ring, and are reported below in degrees centigrade.

For greater accuracy, Gardner colors and values were measured on a Spectronic 301 spectrophotometer (Milton Roy, Rochester, N.Y.) set in the absorbance (Abs) mode. The Gardner values are a digital version of the Gardner colors. For example, a Gardner color of 3- is equivalent to a Gardner value to 2.50 to 2.82; and a Gardner color of 3 is equivalent to a Gardner value of 2.83 to 3.17; and a Gardner color of 3+ is equivalent to a Gardner value of 3.17 to 3.49. The Spectronic 301 is a single beam, visible range spectrophotometer that is microprocessor controlled. The wavelength range is 325 to 900 nm with an accuracy of +/−2 nm and wavelength precision of +/−1 nm. The Spectronic 301 has a photometric range of −0.1 to 2.5 Abs units. The Spectronic 301 requires a thirty minute warmup to maintain these ranges accurately and is calibrated annually using Milton Roy Spectronic standards. Wavelength and photometric data were sent to an external computer by a built-in RS-232C port. The external computer interprets the data, absorbance at wavelengths 200 nm to 700 nm in increments of 10 nm based upon the Gardner colors standards. The data is translated using ASTM standard E308 and provides a printout of both Gardner colors and values. The software is available from Paul N. Gardner Company Inc (Pompano Beach, Fla.).

Rheological measurements were performed on a TA Instruments TA Rheolyst 1000-N (New Castle, Del.) operated with the following parameters when used to obtain rheological curves useful to identify, e.g., cross-over points: Geometry—4 cm parallel plate; Gap—1000 microns; Frequency—6.28 rads/sec; Temperature range =−20 C to 150 C; Ramp rate—3 degree's per minute from 150 C to −20 C; Strain—10% constant.

In the following examples, ESCOREZ™ 5600, UNI-TAC™ R85 LT, UNI-TAC™ R 100 LT, UNI-TAC™ XL-10, WINGTAC™ 10, WINGTAC™ 95, and NIREZ™ 2040 are each trademarks for tackifiers. SHELLFLEX™ 371 and HERCOLYN™ D are each trademarks for hydrocarbon oils. KRATON™ 1107 is a trademark for a thermoplastic rubber and IRGANOX™ 1010 is a trademark for an antioxidant.

EXAMPLES

Example 1

1,4-Cyclohexanedimethanol Rosin Ester

In a suitable reaction vessel, a 10% equivalent excess of tall oil rosin (acid number ~180.0), was charged and melted under a nitrogen blanket after vacuum evacuation. The rosin was melted to ~200° C. and 0.33% of 50% VULTAC™ 2 in toluene, 0.18% IRGANOX™ 1425 and 17.5% 1,4-cyclohexanedimethanol were added to the vessel. The reaction temperature was raised to 275° C. and maintained at that temperature for about 8 hours, until an AN of <25 was reached. Thereafter the volatile components were stripped out of the product mixture under vacuum with a nitrogen sparge. The reaction temperature was decreased to below 200° C. Then stabilizer was added and stirred for fifteen minutes. The final product was analyzed to have an acid number of 13.7, a softening point of 59.5, and a Gardner value of 1.50.

Example 2

1,8-Octanediol Rosin Ester

The procedure of Example 1 was identically followed except that 17.69% of 1,8-octanediol was used in place of the 1,4-cyclohexanedimethanol. The product had an acid number of 17.8, flowed at room temperature, and a Gardner value of 1.78.

Example 3

1,4-Butenediol Rosin Ester

The procedure of Example 1 was identically followed except that a total of 23.51% of 1,4-butanediol was used in place of the 1,4-cyclohexanedimethanol in three separate additions. The initial addition of 11.73% 1,4-butanediol was made up front with a second addition, 5.86%, after ~4 hours and the third, 5.92%, at ~6 hours into the reaction. The reaction had an equivalent excess of 1,4-butanediol of 107.6%. The product had an acid number of 13.3, flowed at room temperature, and a Gardner value of 2.39.

Example 4

1,6-Hexanediol Rosin Ester

The procedure of Example 1 was identically followed except that 14.62% of 1,6-hexanediol was used in place of the 1,4-cyclohexanedimethanol. The product had an acid number of 22.5, flowed at room temperature, and a Gardner value of 1.69. This rosin ester may be used in, for example, a packaging adhesive formulation.

Example 5

Dimer Diol Rosin Ester

The procedure of Example 1 was identically followed except that a total of 47.88% of dimer diol (PRIPLAST™ 2033, Unichema International, Chicago, Ill.) was used in place of the 1,4-cyclohexanedimethanol. The reaction had an equivalent excess of dimer diol of 5.6%. The product had an acid number of 4.4, flowed at room temperature, and a Gardner value of 1.20.

Comparative Example 1

1,3-Propanediol Rosin Ester

The procedure of Example 1 was identically followed except that a total of 13.96% of 1,3-propanediol was used in place of the 1,4-cyclohexanedimethanol in two separate additions. The initial addition of 11.18% 1,3-propanediol was made up front with a second addition, 2.78%, after ~4 hours into the reaction. The reaction had an equivalent excess of 1,3-propanediol of 31.8%. The product had an acid number of 17.2, a softening point of 41.8° C., and a Gardner value of 2.71.

Comparative Example 2

Glycerine Rosin Ester

In a suitable reaction vessel, tall oil rosin (acid number ~180.0) was charged and melted under a nitrogen blanket after vacuum evacuation. The rosin was melted to ~200° C. and 0.51% of 50% VULTAC™ 2 in toluene, 0.18% IRGANOX™ 1425, 0.37% of 50% WESTON™ 399 in toluene and 10.1% (15% equivalent excess) glycerine, were added to the vessel. The reaction temperature was raised to 270° C. incrementally over 8–9 hours. The reaction was maintained at 270° C. until an AN of <15 was reached. Thereafter the volatile components were stripped out of the product mixture under vacuum with a nitrogen sparge. The reaction temperature was decreased to below 200° C. Then stabilizer was added and stirred for fifteen minutes. The final product was analyzed to have an acid number of 9.4, a softening point of 82.4° C., and a Gardner value of 3.32.

Comparative Example 3

Pentaerythritol Rosin Ester

In a suitable reaction vessel, a 10% equivalent excess of tall oil rosin (acid number ~180.0), was charged and melted under a nitrogen blanket after vacuum evacuation. The rosin was melted to ~200° C. and 0.33% of 50% VULTAC™ 2 in toluene, 0.19% IRGANOX™ 1425 and 9.03% pentaerythritol was added to the vessel. The reaction temperature was raised to 280° C. and maintained at the temperature for about 8 hours. The reaction was maintained at 280° C. until an AN of <25 was reached. Thereafter the volatile components were stripped out of the product mixture under vacuum with a nitrogen sparge. The reaction temperature was decreased to below 200° C. Then stabilizer was added and stirred for fifteen minutes. The final product was analyzed to have an acid number of 15.1, a softening point of 100.8° C., and a Gardner value of 4.10.

Example 6

Pressure Sensitive Adhesive Compositions From Rosin Esters of Diols

A. Adhesive Preparation

All adhesives were mixed using the following equipment: bench top metal-sided heating mantle; paddle type stirring bar; electric variable speed motor; pint-sized can; and electronic temperature controller. The adhesives were prepared in 200 gram batches.

The adhesives were compounded by first adding all of the oil (SHELLFLEX™ 371), antioxidant (IRGANOX™ 1010), and rosin ester or other resins to a pint-sized can. The can was placed in the heating mantle and allowed to heat up to 350° F. under a nitrogen blanket. As soon as the solid resin has melted, the resin mixture was agitated by turning on the mixer. As soon as the mixture was completely homogenous and at the 350° F. set point, the thermoplastic rubber (KRATON™ 1107) was slowly added. The rubber was added slow enough as to not drop the temperature below 300° F., or cause the rubber particles to mass together. Once the rubber had completely dissolved and been thoroughly mixed, the adhesive was poured into a silicone lined cardboard box and allowed to cool. The total mix time for the adhesives were between 1 to 4 hours. The mixing time depends on the type of rubber and the concentration of rubber to resin used in the formulation.

The formulations as identified in TABLE A were prepared as described above.

TABLE A

| ADHESIVE FORMULATIONS | | | | | | | | |
|---|---|---|---|---|---|---|---|---|
| Formulation Number: | 1 | 2 | 3 | 4 | 5 | 6 | 7 | 8 |
| KRATON ™ 1107 | 36 | 36 | 36 | 36 | 36 | 36 | 36 | 36 |
| IRGANOX ™ 1010 | 1 | 1 | 1 | 1 | 1 | 1 | 1 | 1 |
| WINGTACK ™ 95 | 43 | 43 | 43 | 43 | 43 | 43 | 43 | 43 |
| UNI-TAC ™ XL-10 | 20 | ~ | ~ | ~ | ~ | ~ | ~ | ~ |
| WINGTACK ™ 10 | ~ | 20 | ~ | ~ | ~ | ~ | ~ | ~ |
| 1,8-Octanediol | ~ | ~ | 20 | ~ | ~ | ~ | ~ | ~ |
| 1,4-Butanediol | ~ | ~ | ~ | 20 | ~ | ~ | ~ | ~ |
| 1,6-Hexanediol | ~ | ~ | ~ | ~ | 20 | ~ | ~ | ~ |
| Dimer Diol | ~ | ~ | ~ | ~ | ~ | 20 | ~ | ~ |
| HERCOLYN ™ D | ~ | ~ | ~ | ~ | ~ | ~ | 20 | ~ |
| SHELLFLEX ™ 371 | ~ | ~ | ~ | ~ | ~ | ~ | ~ | 20 |
| Coat Weight (gsm): | 28 | 26 | 29 | 25 | 25 | 26 | 27 | 25 |
| Totals (% by weight) | 100 | 100 | 100 | 100 | 100 | 100 | 100 | 100 |

B. Adhesive Evaluation

The adhesive formulations 1–8 as identified in TABLE A were evaluated according to the following test methods, with the results set forth in TABLE B. PSTC-1 was used to measure 180 Peels, where SS represents stainless steel, PE represents polyethylene, pli represents pounds/linear inch, and the samples were 1×8 inches.

In the TABLEs herein, where indicated, "s" denotes cohesive split, "ss" denotes slight cohesive split, and "c" denotes adhesive failure with no adhesive residue on the test panel. These designations indicate the mode of failure in testing of pressure sensitive adhesive tapes. More specifically, "c" stands for clean, and refers to the fact that the adhesive failed along the interface of the adhesive to the test panel. This is the most desirable form of failure. It gives an indication of the adhesive's ability to contact the surface and form a bond without allowing a fracture to occur within the mass of the adhesive. Adhesives demonstrating "clean" failure will have a higher cohesive strength (as also indicated by either rheological measurements or shear strength measurements). Basically, since all adhesive remains on the tape face, the internal strength of the adhesive is higher than the adhesion level.

The designation "ss" stands for slight split. This refers to the observation that the adhesive failed cohesively along certain regions of the adhesive mass. A slight split indicates that a fracture in the adhesive mass is able to start but not propagate itself. This mode of failure is not desirable but is better than a full cohesive split ("s", see below). A "ss" failure indicates that the adhesive's cohesive strength is still higher than its adhesion. Most adhesive remains on the tape face with some staining noticeable on the test panel.

The designation "s" stands for split. This refers to an adhesive's tendency to split cohesively. More specifically, "s" means that a fracture in the adhesive starts at the beginning of the adhesive mass and propagates itself throughout the adhesive mass. This observation means that the adhesive's internal strength is weaker than the bond strength to the test panel. Such as result is not desirable as the bond strength will never increase. It also indicates that the static shear of the adhesive will also be poor. A cohesive split leaves equal amounts of adhesive on both the tape face and the test panel.

"Shear" refers to static shear testing performed according to PSTC-7, where min represents minutes, RT represents room temperature (ca. 25° C.), ET represents elevated temperature (65.5° C.), where the shear testing was performed at either RT or ET, and the samples evaluated at RT were 0.5×0.5 inches ×1,000 grams, while the samples evaluated at ET were 1×4 inches×500 grams. PSTC-5 was used to measure Loop Tacks, where pli represents pounds/linear inch and the samples were 1×8 inches. In general, higher values for 180 peels, loop tacks and shear times are preferred.

TABLE B

PERFORMANCE PROPERTIES

|  | Formulation No. | | | |
| --- | --- | --- | --- | --- |
|  | 1 | 2 | 3 | 4 |
| 180 Peels, SS (pli) | 4.2, c | 7, ss | 5.6, c | 6.4, ss |
| 180 Peels, PE (pli) | 2.2, c | 3.5, c | 3.2, c | 3.2, c |
| Loop Tacks (pli) | 1.4 | 6.6 | 7.9 | 6.4 |
| RT Shear (min) | 10.7 | 196.7 | 277.7 | 82.7 |

TABLE B-continued

PERFORMANCE PROPERTIES

| ET Shear (min) | 0.4 | 79.2 | 15.9 | 5.1 |
| --- | --- | --- | --- | --- |
| Coat Weight (gsm): | 28 | 26 | 29 | 25 |

|  | Formulation No. | | | |
| --- | --- | --- | --- | --- |
|  | 5 | 6 | 7 | 8 |
| 180 Peels, SS (pli) | 7.0 c | 5.6 c | 7.6 s | 4.5 s |
| 180 Peels, PE (pli) | 3.1 c | 2.4 c | 3.2 c | 4.6 s |
| Loop Tacks (pli) | 5.3 | 7.8 | 7.1 | 7.1 |
| RT Shear (min) | 171. | 99.7 | 176 | 8.7 |
| ET Shear (min) | 20.5 | 20.7 | 6.4 | 6.7 |
| Coat Weight (gsm): | 25 | 26 | 27 | 25 |

The data in TABLE B demonstrates that compositions of the present invention, which incorporate rosin esters of the present invention, and specifically formulations 3, 4, 5 and 6, have excellent and superior overall performance properties, in addition to having light color, in comparison to prior art compositions.

Example 7

Pressure Sensitive Adhesive Composition From the Rosin Ester of 1,4-Cyclohexanedimethanol A. Adhesive Preparation Adhesives were prepared following the procedure set forth in Example 6, using the components (and amounts thereof) set forth in TABLE C. "1,4-CHDM" indicates a rosin ester prepared from 1,4-cyclohexanedimethanol and rosin. Each of formulations 9 and 10 were prepared in 200 gram batches, with a total mix time of 2.5 hours. Formulation 9 contains a weight ratio of UNI-TAC™ R85 and UNI-TAC™ XL-10, selected so as to have the same softening point (60° C.) as the rosin ester prepared from 1,4-CHDM and used to prepare Formulation 10.

TABLE C

ADHESIVE FORMULATIONS

|  | Formulation Number: | |
| --- | --- | --- |
|  | 9 | 10 |
| KRATON ™ 1107 | 32 | 32 |
| IRGANOX ™ 1010 | 1 | 1 |
| UNI-TAC ™ R85 | 43 | ~ |
| UNI-TAC ™ XL-10 | 24 | ~ |
| 1,4-CHDM | ~ | 67 |
| Totals (% by weight) | 100 | 100 |

B. Adhesive Evaluation

The performance of the adhesive formulations 9 and 10 as set forth in TABLE C were evaluated, with the results as set forth in TABLE D. In TABLE D, "s" indicates cohesive split, "ss" indicates slight cohesive split, and "c" indicates adhesive failure with no adhesive residue on the test panel, as defined above in connection with TABLE B.

TABLE D

PERFORMANCE PROPERTIES

| | Formulation Number: | |
|---|---|---|
| | 9 | 10 |
| 180 Peels, SS (pli) | 5.9s | 5.5c |
| 180 Peels, PE (pli) | 2.1c | 2.7c |
| Loop Tacks (pli) | 6.1ss | 6.5c |
| RT Shear (min) | 0.9 | 6 |

The data in TABLE D demonstrates that a 1,4-CHDM ester of the present invention has superior performance properties compared to an equivalent softening point blend of two prior art rosin esters. For example, adhesives formulated with the CHDM esters are seen to desirably exhibit good shear resistance while retaining high adhesion levels. In addition, formulation 10 is superior to formulation 9 because the former exhibits only adhesive failure whereas the latter exhibits cohesive failure.

Example 8

Hot Melt Packaging Adhesive Composition

A. Adhesive Preparation

Adhesives were prepared following the procedure set forth in Example 6, using the components (and amounts thereof) set forth in TABLEs E and F. Mixing times were on the order of 45–70 minutes for each of the adhesives. For the adhesives set forth in TABLE E, the polymer component was ethylene n-butyl acrylate copolymer (EnBA), while for the adhesives set forth in TABLE F, the polymer component was ethylene vinyl acetate copolymer (EVA). In each of TABLEs E and F, "CHDM ESTER" indicates a rosin ester prepared from 1,4-cyclohexanedimethanol and rosin, which has a softening point of 60° C. Also in TABLEs E and F, "MIXED WINGTACS" refers to a blend of WINGTAC™ 95 and WINGTAC™ 10 (30 wt % WINGTAC™ 95 and 20 wt % WINGTAC™ 10, total 50 wt %) having a softening point that matches the softening point of CHDM ESTER, i.e., a softening point of 60° C.

TABLE E

ADHESIVE FORMULATIONS WITH ETHYLENE n-BUTYL ACRYLATE

| Formulation No.: | 11 | 12 | 13 | 14 | 15 | 16 | 17 |
|---|---|---|---|---|---|---|---|
| IRGANOX ™ 1010 | 1 | 1 | 1 | 1 | 1 | 1 | 1 |
| BE SQUARE ™ 185 | 20 | 20 | 20 | 20 | 20 | 20 | 20 |
| ENBA (XW 23.AH) | 30 | 30 | 30 | 30 | 30 | 30 | 30 |
| UNI-TAC ™ R 100LT | 50 | — | — | — | — | — | — |
| UNI-TAC ™ R 85LT | — | 50 | — | — | — | — | — |
| ESCOREZ ™ 5600 | — | — | 50 | — | — | — | — |
| CHDM ESTER | — | — | — | 50 | — | — | — |
| WINGTAC ™ 95 | — | — | — | — | 50 | — | — |
| MIXED WINGTACS | — | — | — | — | — | 50 | — |
| NIREZ ™ 2040 | — | — | — | — | — | — | 50 |
| Totals % = | 100 | 100 | 100 | 100 | 100 | 100 | 100 |

TABLE F

ADHESIVE FORMULATIONS WITH ETHYLENE VINYL ACETATE

| Formulation No.: | 18 | 19 | 20 | 21 | 22 | 23 | 24 |
|---|---|---|---|---|---|---|---|
| IRGANOX ™ 1010 | 1 | 1 | 1 | 1 | 1 | 1 | 1 |
| BE SQUARE ™ 185 | 20 | 20 | 20 | 20 | 20 | 20 | 20 |
| ELVAX ™ 220 | 30 | 30 | 30 | 30 | 30 | 30 | 30 |
| UNI-TAC ™ R 85LT | 50 | — | — | 3 | — | — | — |
| NIREZ ™ 2040 | — | 50 | — | — | — | — | — |
| CHDM ESTER | — | — | 50 | — | — | — | — |
| ESCOREZ ™ 5600 | — | — | — | 50 | — | — | — |
| WINGTAC ™ 95 | — | — | — | — | 50 | — | — |
| UNI-TAC ™ R 100LT | — | — | — | — | — | 50 | — |
| MIXED WINGTACS | — | — | — | — | — | — | 50 |
| Totals % = | 100 | 100 | 100 | 100 | 100 | 100 | 100 |

B. Adhesive Compatibility

The compatibility of the CHDM ESTER and the competitive resins with each of EnBA and ethylene vinyl acetate copolymer (EVA) was determined with the results set forth in TABLE G, where "C" indicates good compatibility, "SIC" indicates some incompatibility, and "IC" indicates incompatible. These compatibilities were determined by visual inspection of the blend, where a higher degree of opaqueness indicated a higher degree of incompatibility.

TABLE G

RESIN/POLYMER COMPATIBILITY

| | Polymer | |
|---|---|---|
| Resin | EnBA | EVA |
| UNI-TAC ™ R100 LT | C | C |
| UNI-TAC ™ R85 LT | C | C |
| CHDM ESTER | C | C |
| WINGTAC ™ 95 | IC | SIC |
| NIREZ ™ 2040 | C | C |
| ESCOREZ ™ 5600 | SIC | IC |
| MIXED WINGTACS | IC | IC |

C. Adhesive Evaluation

Certain performance properties of the adhesive formulations 11–15 and 17 as set forth in TABLE E were evaluated, with the results as set forth in TABLE H. In TABLE H, Tg measurements were performed on a TA Rheolyst 1000-N (TA Instruments, New Castle, Del.), opacity was measured by visual inspection, where the numbers 1–6 are from most opaque (6) to least opaque (1); and "cross over point" refers to the crossing point of G" and G' curves according to a rheological measurement.

More specifically, a rheological curve as obtained from the TA Rheolyst 1000-N or equivalent rheometer consists of three parts. First is the G' curve which indicates the elastic component of the adhesive. Second is the G" curve which measures the viscous component of the adhesive. Third is the Tan Delta curve which is a ratio of the G" and G' curves, specifically, G"/G'. The "crossover point" on a rheological curve is the intersection of the G" and the G' curves in the flow region of the graph. Specifically, the crossover point is defined as the point on the G" and G' curves were the Tan Delta curve equals one in the flow region of the graph. The "flow region" is the area of the curve that occurs after the rubbery plateau region. The flow region is named as such since it reflects the properties of the adhesive at temperatures where the adhesive is beginning to soften and melt. More specifically, the crossover point can be considered the adhesive's softening point, and/or the SAFT (Shear Adhesion Failure Temperature) value. The crossover point is the temperature above which the adhesive shows no or very little cohesive strength.

The Tg of an adhesive (or other sample) is defined as the point where an adhesive changes from a rigid glassy state to an amorphous rubbery state. Instrumentally, this point is determined using a rheometer to identify the peak of the Tan Delta curve in the region before its minimum. The minimum of the Tan Delta curve is found in the rubbery region of the graph. At temperatures below the Tg, the adhesive will no longer have any adhesive properties.

The difference between the crossover point and the Tg gives an indication of the "open time" of the adhesive. It shows the difference between the lowest possible application temperature and the temperature below which the adhesive will no longer adhere to a surface. The larger the difference between the crossover temperature and the Tg, the longer the end user has to apply the adhesive and adhere the substrates together. If the time is long, the end user is able to apply the adhesive at low temperatures without sacrificing "open time".

The rosin CHDM ester of the invention in combination with EnBA polymers has one of the biggest differences between crossover point and Tg of any combination tested. Such a large difference infers that CHDM ESTER will give a formulator latitude in the ability to create low application temperature adhesives without sacrificing adhesive strength.

TABLE H

PERFORMANCE PROPERTIES

| Formulation Number | Adhesive Tg (° C.) | Cross Over Point (° C.) | Difference Between Cross Over & Tg | Opacity |
|---|---|---|---|---|
| 17 | 84 | 77.6 | −6.4 | 1 |
| 15 | 70.4 | 76.3 | 5.9 | 6 |
| 14 | 72.2 | 79.2 | 7 | 2 |
| 13 | 72.9 | 74.9 | 2 | 5 |
| 12 | 73.3 | 80.2 | 6.9 | 3 |
| 11 | 75 | 70.8 | −4.2 | 4 |

The data in TABLE H demonstrate that an adhesive composition of the present invention (arid specifically Formulation Number 14, which incorporates a rosin ester of the present invention) has excellent compatibility with EnBA polymer (as indicated by an opacity value of 2), yet also has a broad difference between cross-over and Tg, where this broad difference is reflective of the low Tg of the formulation (reflecting that a low application temperature may be used for the formulation) but the high cross-over point (reflecting that the composition has good heat resistance).

The open time ranges of selected adhesive formulations 11–24 as set forth in TABLEs E and F were evaluated, with the results as set forth in TABLE I. The evaluations were performed as follows: approximately 27 g of an EnBA-based adhesive was placed in a pint can and placed in a 150° C. oven to melt. The film applicator was also placed in the oven to heat up. A section of 4×12 inch cardboard (tablet back) was placed on top of the oven to warm and remove any moisture. The cardboard was then secured on top of a Teflon-coated piece of plywood with a large binder clip. The applicator was removed from the oven and placed onto the cardboard to give a 5 mil film. The molten adhesive was then removed from the oven and a small bead was poured inside the width of the applicator. The applicator, with the molten resin, was then moved with one relatively smooth motion over the length of the cardboard to complete the drawdown.

At this time the timer was started and at 2 second intervals a strip (0.5×2 in) of Kraft paper was placed on the film, pressing firmly with the forefinger, fiber side down. This is repeated until the adhesive has set up. After approximately 1 hour each strip was peeled off. Open time, in seconds, was determined by the strip that has 50% of the fiber remaining on the film, according to ASTM D 4497-89. The results from these evaluations are presented in TABLE I.

TABLE I

OPEN TIMES FOR EnBA-BASED ADHESIVES

| Formulation No./Tackifier | Open Times (sec.) |
|---|---|
| No. 17/NIREZ ™ 2040 | 0 |
| No. 11/UNI-TAC ™ R 100LT | 0–2 |
| No. 12/UNI-TAC ™ R 85LT | 8 |
| No. 14/CHDM ESTER | 8 |
| No. 15/WINGTAC ™ 95 | 8–10 |
| No. 13/ESCOREZ ™ 5600 | 2–4 |

The data in TABLE I demonstrates that an adhesive composition of the present invention, incorporating a rosin ester of the present invention (and specifically a CHDM rosin ester) has good open time, comparable and in many instances superior to the open time of adhesives prepared from prior art tackifiers.

The Lap Shear performance data for selected adhesive formulations 11–24 as set forth in TABLEs E and F were evaluated according to the following procedure, according to ASTM D3163–73: on a 1×4 inch acrylonitrile-butadiene-styrene (ABS) sample (rough side up) a line was marked one inch from one of the ends. A small amount of adhesive was melted in a metal dish. The ABS piece was placed on a scale and tared, then 0.4 g of molten adhesive was poured onto the 1 inch area. Immediately a second 1×4 inch piece of ABS was placed on top (to the 1 inch mark) with moderate pressure. The samples were allowed to equilibrate overnight. The samples were then tested on the Instron, method 50 with n=3. This procedure measures the force (psi) required to produce separation of EnBA formulated adhesive. The results are set forth in TABLE J, (for EnBA-based adhesives) and TABLE K (for EVA-based adhesives) where the Max Load values are the average of 2–4 measurements.

TABLE J

LAP SHEAR MEASUREMENTS FOR EnBA-BASED ADHESIVES

| Formulation Number TACKIFIER | Tackifier R&B Softening Point | EnBA Data: Max Load (psi) |
|---|---|---|
| No. 12 UNI-TAC ™ R85 LT | 85° C. | 272.4 |
| No. 11 UNI-TAC ™ R 100 LT | 98° C. | 172.0 |
| No. 14 CHDM ESTER | 60° C. | 147.1 |
| No. 16 MIXED WINGTACS | 60° C. | 11.8 |
| No. 13 ESCOREZ ™ 5600 | 100° C. | 335.2 |
| No. 15 WINGTAC ™ 95 | 95° C. | 208.6 |
| No. 17 NIREZ ™ 2040 | 120 C. | 98.15 |

TABLE K

LAP SHEAR MEASUREMENTS FOR EVA-BASED ADHESIVES

| Formulation Number TACKIFIER | Tackifier R&B Softening Point | EVA Data: Max Load (psi) |
|---|---|---|
| No. 18 UNI-TAC ™ R85 LT | 85° C. | 268.0 |
| No. 23 UNI-TAC ™ R 100 LT | 98° C. | 137.8 |
| No. 20 CHDM ESTER | 60° C. | 219.0 |
| No. 24 MIXED WINGTACS | 60° C. | 20.0 |
| No. 21 ESCOREZ ™ 5600 | 100° C. | 165.8 |
| No. 22 WINGTAC ™ 95 | 95° C. | 49.1 |
| No. 19 NIREZ ™ 2040 | 120° C. | 63.9 |

The data in TABLEs J and K demonstrate that adhesive compositions of the present invention, which incorporate a rosin ester of the present invention, have low softening points which facilitate formulation of the adhesive, yet afford remarkably high adhesive strengths (for such low softening point tackifier), which are comparable and in some cases superior to tackifiers having much higher softening points.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A process of preparing a light colored rosin ester comprising
   a) restricting the supply of rosin to those having a color of Gardner value at least 3;
   b) restricting the supply of polyols to those which contain hydrocarbon groups having at least 4 carbons between hydroxyl groups;
   c) reacting the rosin of a) with the polyol of b) under esterification conditions to provide the light colored rosin ester.

2. The process of claim 1 further comprising subjecting the rosin to a disproportionation reaction.

3. The process of claim 1 wherein the rosin is not dehydrogenated rosin.

4. The process of claim 1 wherein the light colored rosin ester has a color of Gardner value of less than 2.5.

5. The process of claim 1 wherein the light colored rosin ester has a color of Gardner value of between 0.5 and less than 2.5.

6. The process of claim 1 wherein the light colored rosin ester has the formula

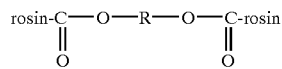

wherein R is an aliphatic or aromatic hydrocarbon moiety having from 4 to 36 carbon atoms and rosin is a resin acid moiety.

7. The process of claim 6 wherein R is an aliphatic hydrocarbon moiety having from 4 to 10 carbon atoms.

8. The process of claim 6 wherein the polyol is 1,4-cyclohexanedimethanol and the light colored rosin ester has the formula

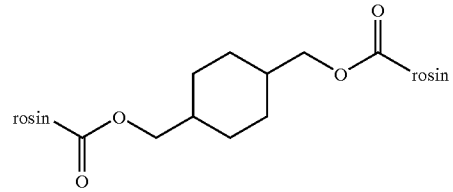

wherein rosin represents a resin acid moiety.

9. The process of claim 1 wherein said hydrocarbon group contains less than 40 carbon atoms.

10. The process of claim 1 wherein said polyol is 1,4-butanediol.

11. The process of claim 1 wherein said polyol is 1,6-hexanediol.

12. The process of claim 1 wherein said polyol is dimer diol.

13. The process of claim 1 further comprising heating a) and b) in the presence of phosphinic acid.

14. The process of claim 1 further comprising heating, a) and b) in the presence of a phosphonate salt.

15. The process of claim 1 further comprising heating a) and b) in the presence of a phenol sulfide compound.

16. A rosin ester made by the process of any of claims 1–5.

17. An adhesive composition comprising a polymer and, as a modifier therefor, a rosin ester made by the process of claim 1.

18. The adhesive composition of claim 17 wherein said adhesive polymer is selected from the group consisting of ethylene vinyl acetate copolymer, ethylene n-butyl acrylate copolymer, ethylene methyl acrylate copolymer, polyester, neoprene, urethane, poly(acrylate), ethylene acrylic acid copolymer, polyether ether ketone, polyamide, styrenic block copolymers, hydrogenated styrenic block copolymers, random styrenic copolymers, atactic polypropylene, polyethylene, ethylene-propylene rubber, butyl rubber, polyester copolymers, natural rubber, polyester, isoprene and a terpolymer formed from the monomers ethylene, propylene and a diene (EPDM).

19. The adhesive composition of claim 18, further comprising an additive selected from the group consisting of wax, process oil, cycloaliphatic hydrocarbon resin, $C_5$ hydrocarbon resin, $C_5$–$C_9$ hydrocarbon resin, $C_9$ hydrocarbon resin, terpene resin, terpene phenolic resin, terpene styrene resin, and esters of rosin and polyols characterized in that the hydroxyl groups thereof are separated by fewer than four carbon atoms.

* * * * *